XR 3,775,816

United States Patent [19]

Gordon et al.

[11] 3,775,816

[45] Dec. 4, 1973

[54] METHOD OF MAKING A MOLDED PIEZOELECTRIC TRANSDUCER ASSEMBLY

[75] Inventors: Norman R. Gordon, Kennewick; Herbert N. Pedersen, Richland, both of Wash.

[73] Assignee: The United States of America as represented by the United States Atomic Energy Commission, Washington, D.C.

[22] Filed: July 27, 1972

[21] Appl. No.: 275,581

Related U.S. Application Data

[62] Division of Ser. No. 142,145, May 11, 1971, abandoned.

[52] U.S. Cl. .................. 29/25.35, 29/628, 264/272, 310/8.9, 310/9.4

[51] Int. Cl. ......................... B01j 17/00, H04r 17/00

[58] Field of Search .......................... 29/25.35, 628; 264/272; 310/9.1, 9.4, 8.2, 8.3, 8.5, 8.9, 8; 340/8 R, 10

[56] References Cited

UNITED STATES PATENTS

| | | | |
|---|---|---|---|
| 2,636,134 | 4/1953 | Arons et al. | 29/25.35 X |
| 3,427,481 | 2/1969 | Lenahan et al. | 310/8.2 |

*Primary Examiner*—Charles W. Lanham
*Assistant Examiner*—Carl E. Hall
*Attorney*—Roland A. Anderson

[57] ABSTRACT

A piezoelectric transducer assembly consisting of a molded inner body securing a piezoelectric crystal, one electrical conductor and the electrical connection therebetween. The surface of the body is plated with a conductive film to provide an electrical connection between the exposed face of the crystal and a second electrical conductor. A molded housing is disposed about the inner body to protect the conductive surface and provide the final configuration for the assembly. Also disclosed is a method for making the described transducer assembly.

4 Claims, 1 Drawing Figure

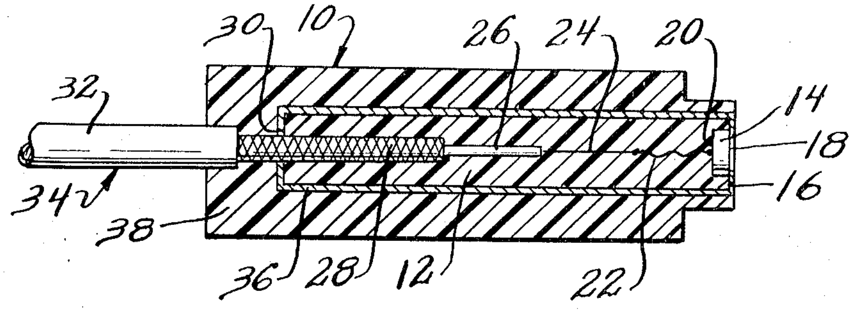
Inventors
Norman R. Gordon
Herbert N. Pedersen
[signature]
Attorney

METHOD OF MAKING A MOLDED PIEZOELECTRIC TRANSDUCER ASSEMBLY

This is a division of application Ser. No. 142,145, filed May 11, 1971 now abandoned.

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a transducer assembly and method of manufacture. More specifically, this invention relates to a molded piezoelectric transducer assembly and method of manufacture.

A transducer can be generally described as a device capable of transforming energy from one form into another form, i.e., electrical energy into mechanical energy. For example, a piezoelectric crystal will produce an electrical signal which is in direct proportion to the amount of acoustical or mechanical energy applied to the crystal. Transducers of this type find untility in applications such as nondestructive testing where small size, light weight and reliability are desirable factors.

Piezoelectric transducer assemblies are expensive because of fabrication difficulties in providing adequate electrical connections between the faces of the crystal and the conductors which carry the electrical signal produced by the crystal to the necesarry instrumentation. These electrical connections are also subject to breakage due to mechanical stresses which may be placed on the assembly. In addition, certain applications require that these transducer assemblies be capable of withstanding relatively high tempertures, for example up to about 600°F.

SUMMARY OF THE INVENTION

I have invented a novel piezoelectric transducer assembly and method for making the same which is relatively simple and inexpensive to construct, is light in weight and which eliminates many of the problems associated with providing electrical connections with the crystal. In addition, by an appropriate choice of materials, a transducer assembly capable of withstanding relatively high temperature can be manufactured.

The assembly consists of inner body of dielectric material which supports the piezoelectric crystal, one conductor and maintains the electrical connection therebetween. A conductive coating on this body provides the connection between the other face of the crystal and a second conductor. This entire inner assembly, except for the exposed face of the crystal is surrounded by a housing of dielectric material which protects the conductive surface and the electrical connection with the second conductor and provides the final configuration for the transducer assembly.

The assembly is made by molding an inner body of an appropriate molding compound about the crystal, one conductor and the connection therebetween, plating a conductive surface on the inner body and subsequently molding a housing of the same material about the inner body.

It is therefore one object of this invention to provide a transducer assembly which is relatively simple and reliable.

It is another object of this invention to provide a piezoelectric transducer assembly which eliminates many of the problems associated with providing adequate electrical connections with the piezoelectric crystal.

It is a further object of this invention to provide a piezoelectric transducer assembly which is capable of withstanding relatively high temperatures.

Finally, it is the object of this invention to provide a method for manufacturing a piezoelectric transducer assembly which fulfills the objects hereinbefore enumerated.

BRIEF DESCRIPTION OF THE DRAWING

The drawing is a longitudinal sectional view of the transducer assembly of the invention.

DESCRIPTION OF THE PREFERRED EMBODIMENT

Referring to the drawing, transducer assembly 10 comprises right circular cylindrical inner body 12 having right circular cylindrical piezoelectric crystal 14 fixedly embedded in forward face 16 of body 12 so that outer face 18 of crystal 14 is even with face 16. Opposite inner face 20 of crystal 14 is electrically connected to one end of strain relieving wire 22 and first conductor 24 located along the longitudinal axis of body 12 is electrically connected to the other end of wire 22. Strain relieving wire 22 contains several loops to provide a cushion to prevent breakage between the electrical connections with face 20 and conductor 24. First conductor 24 is surrounded annularly outward by inner insulation 26, which together with conductor 24 is completely embedded in body 12. Annularly outward of insulation 26 is second tubular conductor 28 extending through rear face 30 of body 12 and which in turn is covered annularly outward by outer insulation 32 shortly beyond face 30 to form coaxial cable 34. Inner body 12 has conductive coating 36 applied to the outer surface thereof which coating covers forward face 16 of body 12, including outer face 18 of crystal 14, to make electrical contact with face 18 and covers rear face 30 of body 12 to make electrical contact with second conductor 28. Tubular housing 38 encloses inner body 12, extending from outer insulation 32 of cable 34 toward forward face 16 ending in nose section 40 of relatively smaller diameter. Housing 38 provides physical protection for conductive coating 36 and the connection with 2nd conductor 28 and defines the final configuration for transducer assembly 10.

Mechanical or acoustical energy applied through coating 36 to outer face 18 of crystal 14 generates an electric potential difference between outer face 18 and inner face 20, which can be measured by appropriate instrumentation connected by cable 34 through 1st conductor 26 and strain wire 22 to inner face 20 and through 2nd conductor 28 through coating 36 to outer face 18.

Inner body 12 and outer body 38 can be molded of any suitable dielectric moldable material capable of withstanding the environment within which the transducer assembly is to be utilized. Examples of these materials are epoxy resins and silicone molding compounds, the latter being especially good for high temperature applications. These silicone molding compounds are generally composed of a phenylsiloxane resin, a filler and a catalyst. The phenyl-siloxane resins are copolymers containing at least two different types of siloxane units, at least one of said units containing a phenyl group. The filler may consist of any of a number of inert compounds such as crushed quartz, diatomaceous earth, precipitated silica and some metal silicates. Suitable catalysts are amines and carboxylic acid salts of many metals, such as Pb, Zn, Zr, Sb and Fe. One such molding compound used successfully to make the assembly of this invention by the method detailed herein later is described in detail in Example I of U.S. Pat. No. 3,208,961, which issued Sept. 28, 1965 to Kookootsedes. This compound was able to withstand temperatures up to 600°F.

Although any piezoelectric cyrstals will work in the transducer of this invention, the particular application described herein used a PZT or lead-zirconium-titanate crystal which had been plated with silver to provide for electrical connections and to protect the crystal.

The method of making the assembly of this invention is to electrically connect one conductor of a two-conductor cable to a strain relieving wire containing several loops which is in turn connected to one face of piezo-electric crystal. These connections may be made by arc welding. An inner body of moldable dielectric material of the composition hereinbefore described is molded about the conductor and crystal, so that the outer face of the crystal remains exposed in the surface of the inner body, thus forming a transducer unit. A metal coating is plated on the surface of the transducer unit including the exposed face of the crystal to provide an electrically conductive surface. This surface is connected electrically to the second conductor by plating a portion of the conductor where it extends through the inner body, thus providing an electrical connection between the outer exposed face of the crystal and the second conductor. A housing of dielectric material is molded over the plated surface of the transducer unit while permitting the forward face of the unit to remain exposed to protect the metal coating, electrical connection with the second conductor, and to form the final configuration of the transducer assembly.

The transducer unit may also be prepared by first molding a tubular body of dielectric material having an internal diameter just large enough to accept the crystal and attached cable, and forcing additional molding material into the tube around the crystal and cable to hold them in place and form the transducer unit.

The transducer unit may be plated with any coating which is electrically conductive and the coating can be applied by an satisfactory method, for example, electroless plating. One conductive surface with which good results were obtained consists of an inner coating of electroless plated copper and an outer coating of electroless plated nickel. The copper is relatively easy to plate on the transducer unit and the outer coating of nickel protects the copper which easily oxidizes at high temperatures.

Before electroless plating the transducer unit, it was found necessary to etch the surface to ensure good adhesion of the plate. This may be accomplished by immersing the transducer unit in a solution of concentrated sodium hydroxide for 3 minutes.

Although most electroless copper of nickel plating solutions will provide a satisfactory conductive coating on the transducer unit, the following solutions were found to give especially good results. To prepare the etched transducer unit for copper plating, it was first sensitized in a solution containing 7 grams stannous chloride and 4 ml 37% HCl in 100 ml water for 10 minutes at ambient temperature and air dried. The sensitized unit was next contacted with an activating solution containing 3 drops of chloroplatinic acid in 100 ml of water for 2 minutes and air dried. The unit was then copper plated by immersing the unit up to the 2nd conductor in a plating solution containing 1.4 gms copper sulfate, 0.75 gms sodium hydroxide, 0.75 gms rochelle salts and 4.4 ml formaldehyde in 100 ml of water. The unit remained in this solution for about 40 minutes before being removed and washed with water.

The copper plated transducer unit was then plated with nickel by emersing the unit in the same manner in solution NL 61, manufactured by Shipley Co., for 20 minutes at 150°F. Although this solution provided a good nickel coating, any electroless nickel plating solution should work equally well.

The molding compounds which may be used with the method of this invention have been previously described. In particular, the silicon molding compound described in Example I of U.S. Pat. No. 3,208,961, issued Sept. 28, 1965, to Kookootsedes, was used by heating the molding compound and a steel mold to 350°F. and forcing the molding compound into the mold under a pressure of 90 psi to form a tubular inner body. A crystal and cable unit was prepared, inserted into the tubular body and heated to 350°F. and additional molding compound was forced into the tube to hold the crystal and cable in place thus forming the inner body.

The inner body thus formed was etched and plated with copper and nickel as hereinbefore described. The plated transducer was then inserted into an appropriate mold, the mold and body heated to 350°F. and additional molding compound forced into the mold to form the transducer assembly.

The PZT crystals used to make the transducers of this invention were 60 mils in diameter and 60 and 30 mils in thickness and had been plated with silver for ease in making electrical connections and to protect the crystal. The tubular molded inner body before insertion of the crystal and cable assembly contained an opening 0.1 inch in diameter. The final configuration of the completed transducer was one-half inch in diameter and one-half inch long with the noise piece being one-fourth inch in diameter and extending 0.1 inch from the main body.

The transducer made by the method of this invention was found to have sensitivity and responsiveness as good as transducers made by other methods which were heavier and more expensive to produce.

It can be seen that the transducer and method of making the transducer which comprises this invention is lightweight, effective and relatively simple and inexpensive to produce.

It will be understood that the invention is not to be limited to the details given herein but that it may be modified within the scope of the appended claims.

The embodiments of the invention in which an exclusive property or privilege is claimed are defined as follows:

1. A method of making a piezoelectric transducer assembly from a piezoelectric crystal having inner and outer opposite faces and from a cable having first and second conductors comprising:

a. connecting electrically the first conductor of said cable to the inner face of said crystal;

b. molding an inner body about said crystal and said first conductor, while permitting the outer face of said crystal to remain exposed in the surface of said inner body, thus forming a transducer unit;

c. plating a metal coating on said transducer unit and the outer face of said crystal, thus providing an electrically conductive surface;

d. connecting electrically the second conductor of the cable with the metal coating thus providing an electrical connection between the outer face of the crystal and the second conductor; and e. molding a housing about the metal coating on the inner body, while permitting the second side of the crystal to remain exposed, thus protecting the metal coating and forming the transducer assembly.

2. The method of claim 1 wherein the transducer unit is etched by contacting the unit with a solution of concentrated NaOH before plating the metal coating thereon.

3. The method of claim 2 wherein the etched transducer unit is plated with a coating of copper.

4. The method of claim 3 wherein the copper-plated transducer unit is also plated with a coating of nickel.

* * * * *